March 8, 1932.      W. H. WISHART      1,848,451
VEHICLE PROPELLED BY MUSCLE POWER
Filed Nov. 28, 1930
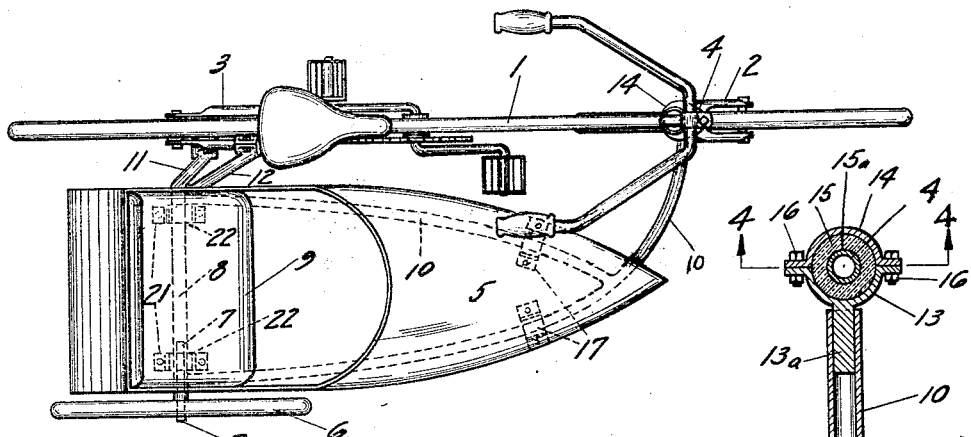
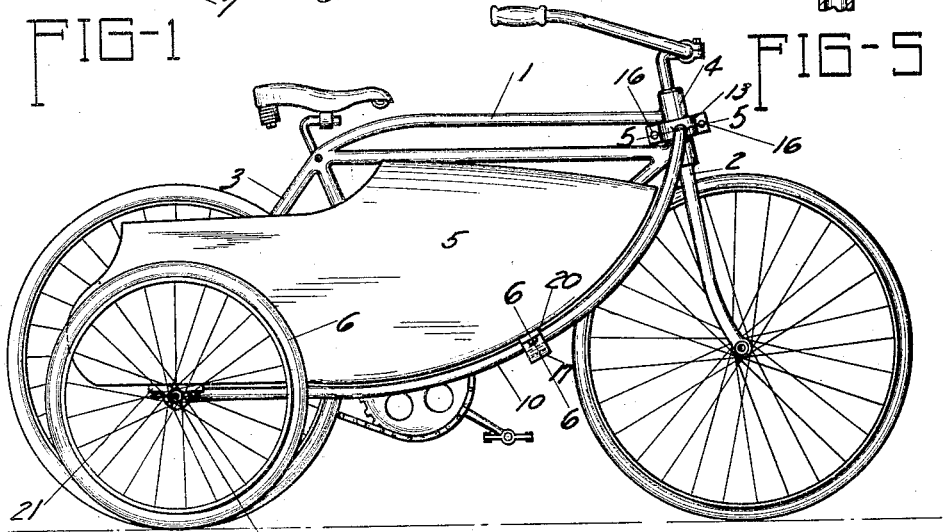
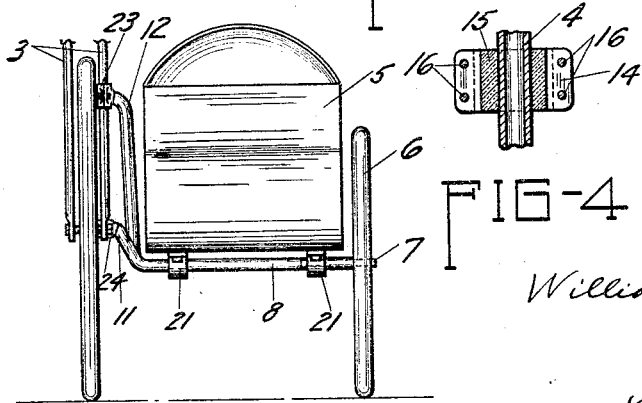
William H. Wishart Inventor
By Curtis V Bush
Attorney Patented Mar. 8, 1932

1,848,451

UNITED STATES PATENT OFFICE

WILLIAM H. WISHART, OF IOWA CITY, IOWA

VEHICLE PROPELLED BY MUSCLE POWER

Application filed November 28, 1930. Serial No. 498,696.

My invention relates to improvements in vehicles propelled by muscle power.

The objects of my invention are:

1. To provide a bicycle with a sidecar attached thereto in such form as not to interfere with the propulsion of the bicycle by the rider;

2. To provide means for attaching a sidecar to a bicycle which will secure it firmly thereto and at the same time reduce to a minimum the shocks and vibration transmitted by the sidecar to the bicycle.

I attain these objects by the means illustrated in the accompanying drawings, in which,—

Figure 1 is a plan view of a bicycle with sidecar attached embodying my invention;

Figure 2 is a side elevation of the same;

Figure 3 is a rear elevation of the same;

Figure 4 is an enlarged sectional detail on the line 4—4 of Figure 5;

Figure 5 is an enlarged sectional detail on the line 5—5 of Figure 2;

Figure 6 is an enlarged sectional detail on the line 6—6 of Figure 2, but this view would also be applicable to a similar sectional view of the clamps, 21, and adjacent parts.

Similar numerals refer to similar parts throughout the several views.

My invention comprises a bicycle, 1, with front fork, 2, and rear fork, 3, constructed in any of the forms now common to the bicycle trade, as I make no claim to any particular form of bicycle. To this bicycle I attach a sidecar comprising a body, 5, a forked supporting frame, 10, an axle, 8, and connecting arms, 11 and 12.

The frame, 10, axle, 8, and arms, 11 and 12, are preferably formed of seamless tubing such as is commonly used for bicycle frames and the different parts may be brazed together or otherwise secured in any suitable manner.

The front end of the frame, 10, is bent laterally to form a connection with the head of the bicycle. This connection comprises clamp members, 13 and 14, with bolts, 16, securing them together and a split rubber bushing, 15, which surrounds the head, 4, of the bicycle and cushions the connection of the clamp thereto. This rubber bushing, 15, is split at 15a, so as to be readily assembled upon the head, 4, of the bicycle. The clamp member, 13, has a shank, 13a, formed integral therewith which extends into and is preferably brazed to the lateral extension of the frame, 10.

The arm, 11, is preferably formed integral with the axle, 8, and is clamped to one of the lower sidebars of the bicycle by a clamp, 24, which is in all respects similar to the clamp, 13—14, shown in Figure 5.

The arm, 12, has its lower end brazed to the axle, 8, and arm, 11, or is otherwise suitably united thereto and its upper end is provided with a clamp, 23, in all respects similar to the clamp, 13—14, which secures it to the adjacent member of the rear fork, 3, of the bicycle. The clamps, 23 and 24, are provided with rubber bushings of the same type as the bushing, 15.

The body of the car, 6, is secured to the frame, 10, by clamps, 17, which respectively surround the members of the frame, 10, and are bolted to the body, 5, by bolts, 20. Split rubber bushings or cushions, 18, are enclosed within the clamps, 17, to cushion the body, 5, upon the frame, 10. These cushions, 18, are split at 19 so that they may be easily placed around the frame members, 10, and secured within the clamp, 17. Similar clamps, 21, with corresponding split rubber bushings, are used to secure the rear end of the body, 5, to the axle, 8.

A wheel, 6, is pivotally secured upon the axle, 8, by a shaft, 7, which may be secured to the axle, 8, by any of the well-known methods in common use.

The wheel, 6, is preferably made considerably smaller than the bicycle wheels, thus affording a low center of gravity for the sidecar and permitting an arrangement which gives more leg room for the rider of the bicycle.

In assembling my conveyance, the body, 5, is first mounted upon the frame, 10, and axle, 8, as described, and the clamps, 13—14, 23—24, are then put in place with the rubber cushions inside of them and bolted securely together. The sidecar, 5, is preferably provided with a seat, 9, and may be in any desired form.

I claim:

1. A combined bicycle and sidecar comprising a bicycle, a sidecar frame, a supporting wheel pivotally attached to the sidecar frame, a body mounted upon the frame, clamping members united to the sidecar frame adapted to embrace the head and a side member of the bicycle frame, and rubber cushions seated within the clamps and surrounding the bicycle members embraced thereby.

2. A combined bicycle and sidecar comprising a bicycle, a sidecar frame, a supporting wheel pivotally attached to the sidecar frame, a body mounted upon the frame, clamping members united to the sidecar frame adapted to embrace the head and a plurality of the side members of the bicycle frame, and resilient cushions mounted upon the head and side members of the bicycle and embraced within the clamps.

3. A combined bicycle and sidecar comprising a bicycle, a sidecar frame, a supporting wheel pivotally attached to the sidecar frame, a body mounted upon the frame, clamping members united to the sidecar frame adapted to embrace the head and a side member of the bicycle frame, and rubber cushions seated within the clamps and surrounding the bicycle members embraced thereby.

4. A combined bicycle and sidecar comprising a bicycle, a sidecar frame, a supporting wheel pivotally attached to the sidecar frame, a body mounted upon the frame, clamping members united to the sidecar frame adapted to embrace the head and a plurality of the side members of the bicycle frame, and rubber cushions mounted upon the head and side members of the bicycle and embraced with the clamps.

In testimony whereof he affixes his signature.

WILLIAM H. WISHART.